Nov. 19, 1957 W. E. BELLER 2,813,541
FLUID FLOW CONTROL MEANS
Filed Nov. 12, 1954
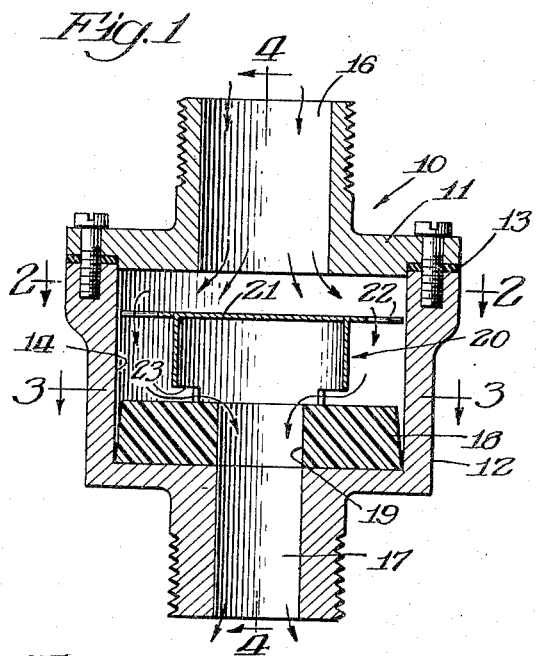
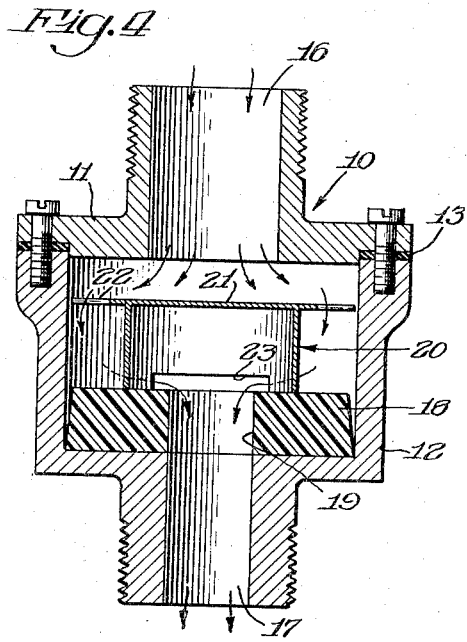
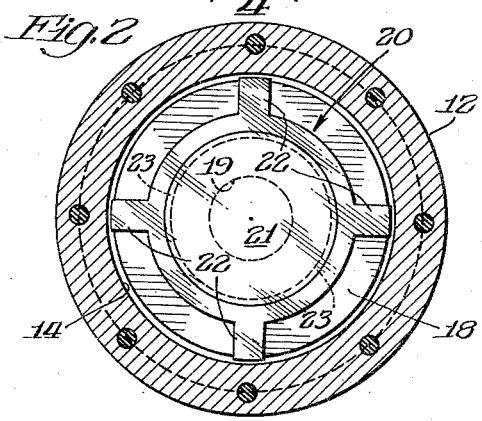
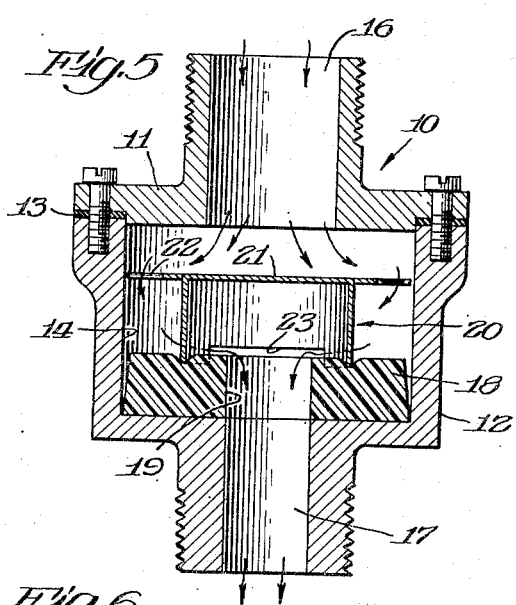
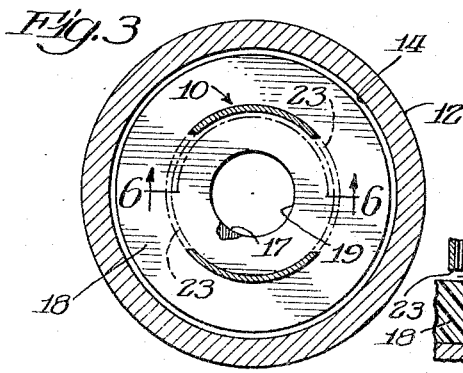
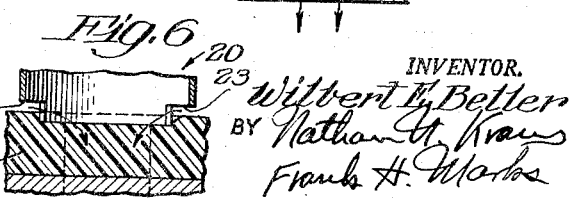
INVENTOR.
Wilbert E. Beller
BY Nathan A. Kraus
Frank H. Marks
ATTYS

United States Patent Office 2,813,541
Patented Nov. 19, 1957

2,813,541

FLUID FLOW CONTROL MEANS

Wilbert E. Beller, Park Ridge, Ill., assignor, by mesne assignments, to Controls Company of America, Schiller Park, Ill., a corporation of Delaware Application November 12, 1954, Serial No. 468,264

10 Claims. (Cl. 137—504)

This invention relates to fluid flow control means.

One of the objects of my invention is the provision of means for controlling the flow of fluid to obtain a substantially constant rate of discharge flow irrespective of variations in the upstream or downstream pressures.

Another object of my invention is the provision, in a device of the foregoing character, of means responsive to pressure differential variations, whereby the discharge orifice is automatically adjusted in inverse ratio to the pressure of the fluid delivered at the inlet port.

A further object of my invention is the provision of a flow control device which is simple in construction, durable in service and efficient in operation.

Other and further objects and advantages of my invention will become apparent from the following description when considered in connection with the accompanying drawings, in which—

Fig. 1 is a vertical cross-sectional view of a device in accordance with my invention;

Fig. 2 is a cross-sectional view taken substantially along line 2—2 of Fig. 1;

Fig. 3 is a cross-sectional view taken substantially on line 3—3 of Fig. 1;

Fig. 4 is a cross-sectional view taken substantially on line 4—4 of Fig. 1;

Fig. 5 is a cross-sectional view similar to Fig. 4, but showing the parts in a different operating relation;

Fig. 6 is a cross-sectional view taken substantially on line 6—6 of Fig. 3, but showing the parts in the same relation illustrated in Fig. 5.

Referring to the drawings, my invention comprises a casing 10 formed of a pair of sections 11 and 12 suitably joined together with an intermediate gasket 13, in fluid-tight relation. The casing includes a chamber 14 communicating with inlet and outlet ports 16 and 17, respectively. Resting on the bottom of the chamber 14 is a disk 18 of resilient material provided with a central aperture 19 which is in registration with the outlet port 17 and is substantially of the same cross-sectional area. It will be understood that the disk 18 may be of any suitable shape and may be formed of any suitable elastomer which may include rubber, synthetic rubber or any plastic compound having a desired resilience. Resting on the disk 18 is a rigid inverted cup-shaped member 20 having a face 21 and provided with a spider 22, the arms of which serve to locate the member 20 substantially centrally of the chamber 14. It will be apparent that the said member is free to move axially of the chamber 14. The cup member 20 in the embodiment illustrated is open at the bottom, and the lower edges thereof are cut away to provide one or more recesses 23 which I term the characterizing orifices of my device. It will be understood, however, that my invention is not limited to the specific embodiment illustrated, but may include either a hollow or a solid element of any suitable shape having a surface area on which fluid pressure may act and including any suitable cutouts or recesses for the passage of fluid therethrough. It will also be understood that, instead of a spider attached to the member 20, other means such as, for example, fins or abutments attached to the inner wall of the chamber 14 may be used for centering the member 20.

In the operation of my invention, as fluid, the direction of flow of which is indicated by the arrows, enters the inlet port 16, it passes into the chamber 14 impinging on the face 21, then through the recesses or characterizing orifices 23 into the outlet port 17. Control of the rate of flow of fluid, according to my invention, is effected by the degree of indentation of the cup member 20 into the resilient disk. The degree of indentation of the member 20 into the disk 18 is a function of the pressure differential which results when fluid flow is restricted by the orifices 23, thereby allowing a build-up of upstream fluid pressure. This pressure differential effects a predetermined indentation of the member 20 into the disk 18, which correspondingly changes the effective flow passage area of the orifices 23. When the pressure differential of the fluid passing through orifices 23 is relatively low, there will be a correspondingly slight indentation of the member 20 into the disk 18. As the pressure differential is progressively increased, the member 20 is caused to indent progressively into the disk 18 to a greater degree. As seen clearly in Figs. 5 and 6, the indentation of the member 20 into the disk 18 effects a further restriction in the area of the orifices 23 through which the fluid passes into the discharge port. Thus there is maintained a definite relationship between the pressure differential of the fluid across the orifices and the area of the orifices within the operating range of the device, resulting in a substantially constant rate of discharge of fluid. As the pressure differential of the fluid across the orifices 23 is reduced, the effective pressure head acting on the effective area of face 21 of the member 20 is correspondingly reduced, resulting in a lesser degree of indentation of the said member into the disk 18 and an increase in the effective flow passage area of the orifices 23. The effective flow passage area of the orifices 23 will vary inversely as the square root of the force applied on the effective area of face 21 of the member 20.

It will be understood that the means for controlling the rate of flow of fluid is merely illustrative of the broad concept of my invention, and that it is contemplated that the size and form of the indenting member, as well as the shapes and sizes of the flow passage areas, together with the degree of resilience of the disk, may be suitably varied to satisfy different operating conditions.

It will also be understood that the device of my invention may be constructed so as to afford control of rate of fluid flow to provide, for example, a greater rate of flow at low pressures and a reduced rate of flow at high pressures to meet desired requirements.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. A fluid flow control device comprising in combination a member having a chamber having an inlet and an outlet, said outlet having a concentric shoulder adjacent thereto, a resilient member rested on said shoulder and having a central aperture for alignment with said outlet, an inverted generally cup-shaped member having an opening in a lower marginal edge thereof and rested on said resilient member, said opening affording communication between said inlet and said outlet, said cup-shaped member when acted upon by fluid pressure differential being indented into said resilient member and reducing the effective area of said opening, thereby to control the quantity of fluid passing therethrough.

2. A fluid flow control device comprising in combination a member having a chamber having an inlet and an outlet, said outlet having a concentric shoulder adjacent thereto, a resilient member rested on said shoulder and having a central aperture for alignment with said outlet, a relatively thin-walled generally hollow rigid member having a closed end in confronting relation to said inlet and an open end in relation to said resilient member and rested on said resilient member, said rigid member having an opening adjacent said open end, said opening affording communication between said inlet and said outlet, said rigid member when acted upon by fluid pressure differential being indented into said resilient member and reducing the effective area of said opening, thereby to control the quantity of fluid passing therethrough.

3. A fluid flow control device comprising in combination a member having a chamber having an inlet and an outlet port, said outlet port having a concentric shoulder adjacent thereto, a resilient member rested on said shoulder and having a central aperture for alignment with said outlet port, an inverted generally cup-shaped member having an opening in a lower marginal edge thereof and rested on said resilient member, said opening affording communication between said inlet and said outlet ports, the lower edge of said cup-shaped member being adapted to indent into said resilient member to reduce the effective area of said opening, thereby to control the quantity of fluid passing therethrough.

4. A fluid flow control device comprising in combination a member having a chamber having an inlet and an outlet port, said member having a yielding elastic surface adjacent said outlet port, an inverted cup-shaped member having its open end edge surface in contact with a portion of said elastic surface, said edge surface having a recess therein providing an orifice for fluid passage, said edge surface upon an increase in fluid pressure differential across said orifice being indented into said elastic surface, thereby changing the size of the orifice.

5. A fluid flow control device comprising in combination a member having a chamber having an inlet and an outlet port, said member having a yielding elastic surface adjacent said outlet port, a substantially tubular member closed at the upper end, the lower end being open and the edge surface thereof being in contact with a portion of said elastic surface, said edge surface having a recess therein providing an orifice for fluid passage, said edge surface upon an increase in fluid pressure differential acting on said tubular member being adapted to indent into said elastic surface to reduce the effective area of said recess, thereby to control the quantity of fluid passing therethrough.

6. A fluid flow control device comprising in combination a member having a chamber having an inlet and an outlet port, said member having a yielding elastic surface adjacent said outlet port, an inverted cup-shaped member having its open end edge surface in contact with a portion of said elastic surface, said edge surface having a recess therein providing an orifice for fluid passage, said edge surface upon an increase in fluid pressure differential across said orifice being indented into said elastic surface, thereby changing the size of the orifice, and means for disposing said cup-shaped member substantially in coaxial relation with said outlet port.

7. A fluid flow control device comprising in combination a member having a chamber having an inlet and an outlet port, said member having a yielding elastic surface adjacent said outlet port, an inverted cup-shaped member having its open end edge surface in contact with a portion of said elastic surface, said edge surface having a recess therein providing an orifice for fluid passage, said edge surface upon an increase in fluid pressure differential across said orifice being indented into said elastic surface, thereby changing the size of the orifice, and a plurality of radial arms associated with said cup-shaped member, said arms maintaining said cup-shaped member substantially in coaxial relation with said outlet port.

8. A fluid flow control device comprising in combination a member having a chamber having an inlet port and an outlet port and a shoulder adjacent said outlet port, an annular resilient member concentric with said outlet port and rested on said shoulder, a rigid inverted cup member having an open end in confronting relation to one face of said resilient member and having an orifice in an edge of the side wall thereof, said inverted cup member being movable relative to said resilient member, whereby fluid pressure acting on said movable member will cause said resilient member to change the area of said orifice and thus restrict the flow of fluid through said orifice.

9. A fluid flow control device comprising in combination a member having a chamber having an inlet port and an outlet port, said outlet port having a shoulder adjacent thereto, a resilient member rested on said shoulder and having a central aperture communicating with said outlet port, a rigid member having a face in confronting relation to said inlet port and an annular flange opposite said face and in engagement with said resilient member, said rigid member having a recess in the edge of said flange constituting an orifice and affording communication between said inlet and outlet ports, said rigid member being movable relative to said resilient member, and said flange upon an increase in the pressure differential of the fluid being adapted to indent into said resilient member to reduce the effective area of said recess, thereby to control the quantity of fluid passing therethrough.

10. In a fluid flow control having an inlet port and an outlet port, a resilient seat substantially concentric with and coaxial with said outlet port, a rigid member having a face in confronting relation to said inlet port and an annular flange opposite said face and in engagement with said seat, said flange having a recess in an edge thereof constituting an orifice and affording communication between said inlet and outlet ports, said flange upon an increase in the pressure differential of the fluid being adapted to indent into said resilient seat to reduce the effective area of said recess, thereby to control the quantity of fluid passing therethrough.

References Cited in the file of this patent

UNITED STATES PATENTS

| 2,289,905 | Dasher | July 14, 1942 |
| 2,508,793 | Miller | May 23, 1950 |
| 2,554,790 | Miller | May 29, 1951 |
| 2,584,418 | Branson | Feb. 5, 1952 |